Patented Aug. 28, 1951

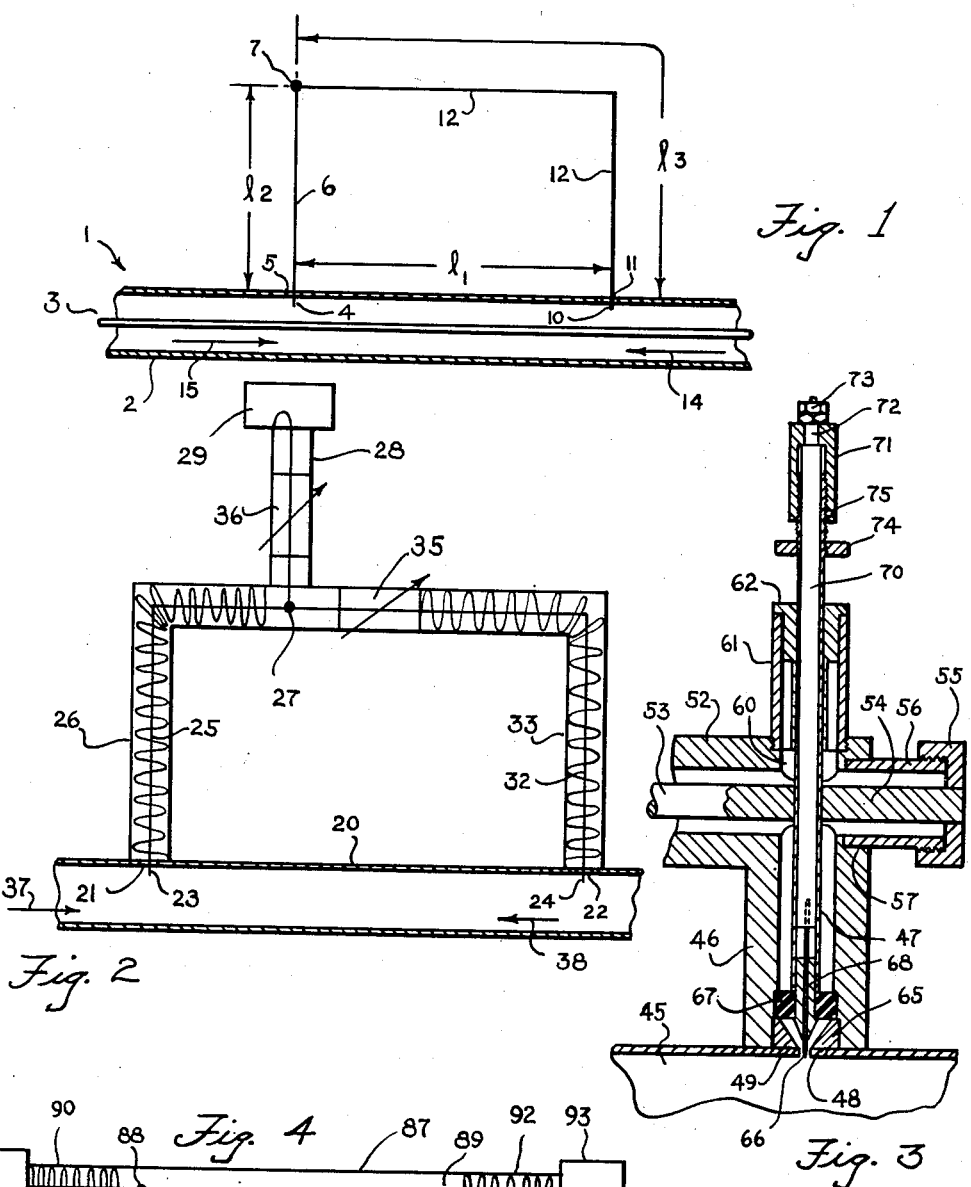

2,566,020

UNITED STATES PATENT OFFICE 2,566,020

HIGH-FREQUENCY DETECTING DEVICE

Willard H. Fenn, Cambridge, Mass., assignor, by mesne assignments, to the United States of America as represented by the Secretary of the Navy Application January 4, 1945, Serial No. 571,319

11 Claims. (Cl. 171—95)

This invention relates to detecting and measuring devices for high frequency electric waves.

In a high frequency transmission line carrying radio frequency power to a load which has an impedance not equal to the characteristic impedance of the transmission line there will be present two separately distinct waves of electric energy. The first of these, traveling from the source of power towards the load, is usually referred to as the incident wave, while the second, traveling from the load towards the energy source, is referred to as the reflected wave. The relative amplitude of the two waves is a function of the impedance difference between the characteristic impedance of the transmission line and the impedance of the terminating load. These two traveling waves combine, resulting in a standing wave which has points of maximum and minimum voltages spaced from each other a distance equal to one-half the wave length of the radio frequency energy.

One of the objects of the invention is to provide a device which will detect one of these high frequency waves while excluding the other.

Another object of the invention is to provide a device which will detect high frequency electric waves traveling in a particular direction along a transmission line, excluding waves of the same frequency traveling in the opposite direction.

Another object of the invention is to provide a device which will select and measure one of two high frequency electric waves traveling in opposite directions along a transmission line.

Another object of the invention is to provide a device which may be used to measure standing waves in a high frequency transmission line.

Other objects of the invention will be apparent as the description thereof proceeds.

The invention is illustrated in the accompanying drawings in which:

Figure 1 is a diagram representing certain principles of the invention;

Figure 2 is a schematic representation of one form of device incorporating the invention;

Figure 3 is a longitudinal sectional view through the center of one of the probes and associated connection of the device of the invention, showing one manner of adjusting the depth of the probe into the transmission line; and Figure 4 is a schematic representation of another embodiment of the invention.

Broadly, my invention comprises a device which has two small probes adapted to be inserted into a transmission line, such as a coaxial line or tubular wave guide, each to withdraw from the transmission line a very small amount of energy. Each of the probes is provided with a transmission line connection leading to a detector, such as a crystal detector, bolometer, or other device for detecting electric energy at high frequencies. The arrangement is such that the detector will respond only to high frequency electric waves traveling in one direction along the transmission line. In this manner the electric waves traveling in each direction may be measured so that the standing wave ratio may easily be determined.

Certain principles of the invention have been illustrated diagrammatically in Figure 1 in which a coaxial cable 1 has been shown having an outer tubular conductor 2 and an inner coaxial conductor 3. This coaxial line is shown merely by way of example, it being understood that the invention may be used as well with other kinds of transmission lines, as for instance, rectangular and circular wave guides. A probe 4 is inserted through an opening 5 in the outer conductor 2 of the coaxial line and is connected by means of a suitable line section 6, which, in this case, has been indicated as a single line, to a point 7 at which is positioned the detecting device (not shown in this figure). The electrical length of the section 6 of the line has been represented by $l_2$. A second probe 10 is shown inserted through another opening 11 in the outer conductor 2 of the coaxial line 1, the two probes being spaced apart an electrical distance represented in the figure by $l_1$. The probe 10 is connected by means of another section 12 of the line to the point 7 at which is located the detecting device. The electrical distance between the probe 10 and the point 7 along the section 12 of the line is represented by $l_3$. These probes are shown for the purpose of illustration, it being understood that any other suitable device, such as a loop or an iris may be used to extract energy from the transmission line 1.

The term "electrical length" used in the above paragraph and hereafter in the specification and claims is intended to mean a physical length of such value as to give the same electrical effect as would be obtained by a physical length in free space equal to the electrical length. The electrical length of the connections $l_1$, $l_2$, and $l_3$ of Figure 1 may therefore differ from the actual physical length of these connections, depending on the construction of the particular line section and other factors.

An arrow 14 represents a high frequency electric wave, which may be the incident wave, traveling towards the left in the coaxial line 1, while another arrow 15 represents a high frequency electric wave, which may be the reflected wave, traveling in the opposite direction along the transmission line. If the two probes each take some energy from the line, energy picked up by the probe 10 from a wave traveling in the direction of the arrow 14 will pass through the line section 12 to reach the point 7, but energy from the same wave will also reach the same point 7 by continuing farther along the transmission line 1 to the probe 4 and then passing along the line section 6. There will thus be two waves reaching the point 7 which have traversed two different paths. In the same manner some energy from the wave traveling in the direction of the arrow 15 will pass directly along the line section 6 from the probe 4 to the point 7, and some will travel along the transmission line to the probe 10 and then to the point 7 through the line section 12.

In accordance with my invention, the two waves produced by the wave traveling in the direction of the arrow 14 are caused to be in phase when they reach the point 7, so that they will add together in the detecting device. However, the two waves produced by the wave traveling in the direction of the arrow 15 are caused to be 180 degrees out of phase and equal in amplitude when they reach the point 7, so that they cancel out and produce no effect on the detecting device.

In order to obtain the results in phasing described above it is necessary to have certain relations between the electrical distances $l_1$, $l_2$, and $l_3$, as shown in Figure 1. These electrical distances are functions of the wave length of the particular electric waves which the device is intended to detect and measure and will be referred to in terms of the wave length. The necessary relations between $l_1$, $l_2$, and $l_3$ will be seen from the following discussion:

If the two electric waves derived from the wave traveling in the direction of the arrow 14 are to be in phase when they reach the point 7, then $$l_3 + a\lambda = l_1 + l_2 \quad (1)$$

where "$a$" equals zero or some whole number and $\lambda$ equals the wave length.

If, at the same time the two waves produced by the electric wave traveling in the direction of the arrow 15 are to reach the point 7 in opposite phase relation, then $$l_2 + \frac{b}{2}\lambda = l_1 + l_3 \quad (2)$$

where "$b$" equals some odd number.

Adding (1) and (2)

$$L_1 = (2b+b)\frac{\lambda}{4} \quad (3)$$

Subtracting (1) from (2)

$$L_3 - L_2 = (b - 2a)\frac{\lambda}{4} \quad (4)$$

It will be seen from equation (3) that $L_1$, the electrical length of the transmission line between the probes, is equal to an odd quarter wave length, and from Equation 4 that the electrical length $L_3$, from the probe 10 to the point 7 less the electrical length $L_2$, from the probe 4 to the point 7 is also an odd quarter wave length.

These, however, are not the only conditions that have to be met to produce the results of the invention. A requirement of impedance matching is also necessary. The characteristic impedances of the line sections 6 and 12 should be equal and the impedances looking into the sections 6 and 12 at the probes 4 and 10 should be equal to this characteristic impedance. Also, there should be the same impedance looking into the detector from the point 7.

One way of providing the proper impedance matching is by the arrangement of Figure 2. Here a transmission line 20, shown as a tubular wave guide, is provided with openings 21 and 22 into which are inserted, respectively, the probes 23 and 24. The probe 23 forms the end of a central conductor 25 of a coaxial line section 26 which leads to the point 27, the latter being connected by means of a coaxial line section 28 to the detector 29. The other probe 24 forms the end of a central conductor 32 of a coaxial line section 33 which leads from the probe 24 to the point 27. The characteristic impedances of the line sections 26 and 33 are equal and both of these line sections are either in whole or in part "lossy" lines, by which is meant that they provide high attenuation of the energy traveling therethrough. Such lines may be coaxial lines in which the central conductors are separated from the outer conductors by some insulating material, as, for instance, "polystyrene." One characteristic of a lossy line is that it will not reflect a terminating impedance to the input end of the line. The reflection of impedance in lossless transmission lines results from the reflection of energy from the terminating impedance to the input end of the line. In a lossy line this reflected energy is dissipated by the losses in the line before it can reach the input end of the line. Thus the input impedance of a lossy line is its characteristic impedance regardless of the impedance terminating the line.

In the present invention if either of sections 26 or 33 were constructed of lossless transmission lines and had a length other than a half wave length or some multiple thereof, the high impedance of the probes 23 and 24 would be transformed at the point 27 to an impedance in shunt with the detector input. However, since lines 26 and 33 are in whole or in part "lossy" such a reflection of impedance is prevented. Thus, the impedance looking into the line section 26 at the probe 23 and the impedance looking into the line section 33 at the probe 24 will be essentially the characteristic impedance of the lossy line.

If desired, a suitable line stretcher 35 may be included in the section 33 so that the electrical length of this section may be adjusted accurately for a particular wave length. Such a line stretcher may be any type of device used for the purpose of adjusting the electrical length of a transmission line. A similar line stretcher 36 may be connected between the point 27 and the detector 29 in the line section 28 in order to insure the proper impedance match between this point and the detector 29.

It is also important to have the energy reaching the detecting device through one path equal to the energy reaching the detecting device through the other path. This can be done by properly portioning the amount of energy picked up by the probes and the attenuation in the lossy lines. Some kind of an adjustment is desirable, either for the amount of energy picked up by the probes or the amount of attenuation in the connections or both. The former is the easier method and may be accomplished by providing either one or both of the probes with an adjustment whereby the probe may be moved axially of itself with respect to the transmission line to adjust the distance the probe extends into the line.

One form of such an adjustable probe is shown in Figure 3. In this figure is represented a portion 45 of a transmission line which may be the line 20 of Figure 2. A coaxial line which may represent the coaxial line 33 of Figure 2 is shown having an outer conductor 46 and an inner conductor 47 upon the lower end of which is the probe 48 which extends into the opening 49 in the line 45. The outer conductor 46 is preferably formed of heavy material, since it rests upon the transmission line 45 and acts as one of the supports of the device. A right angle bend is provided in the line with an outer conductor portion 52 which is integral with the conductor 46 and an inner conductor 53 which is electrically connected to the inner conductor 47. The inner conductors 47 and 53 may be rigidly connected together, as by soldering, and both may be supported within the outer conductors by a stub 54 which forms a continuation of the conductor 53 and is rigidly attached to a cap 55 threaded upon a bushing 56 which is fitted into an opening 57 in the wall of the outer conductor 46. The electrical distance from the conductor 47 to the cap 55 is one quarter wave length, so that the short circuit between the stub 54 and the cap 55 will be reflected back as an open circuit at the juncture of the inner conductors 47 and 53, and these conductors are thus supported with respect to the outer conductors 46 and 52 while maintaining the spacing effect.

In order to provide an adjustment for the probe 48 the inner conductor 47 is tubular and extends upwardly through an opening 60 in the outer conductor 52. A sleeve 61 fitted into the opening 60 and provided with a bushing 62 at the outer end thereof provides a support for the upper end of the conductor 47, the latter being rigidly secured to the bushing. The inner end of the bushing 62 is spaced from the conductor 53 a quarter wave length, so as to reflect back an open circuit at the juncture of the conductors 53 and 47. Thus, the upper extension beyond the conductor 53 of the conductor 47 has substantially no effect on the spacing between the inner and outer conductors.

The probe 48 is protected by a bushing 65 which fits into the open end of the outer conductor 46 and has a tubular extension 66 of reduced diameter to fit through the hole 49 in the transmission line 45. The opening through the bushing 65 is considerably larger than the diameter of the probe 48 and tapers to a large diameter at the inner end of the bushing which abuts against a bead 67 of insulating material, such as "polystyrene," the bead acting to space the lower end of the conductor 47 and the probe within the outer conductor 46. A bushing 68 having a hole through the center thereof to fit closely around the probe 48 and permit sliding movement therein is closely fitted into the insulating bead 67. The other end of the bushing 68 has a tapered surface conforming somewhat to the tapered inner surface of the bushing 65 but spaced from the wall thereof. The bushing 68 is rigidly secured within the end of the conductor 47 which abuts against the insulating bead 67.

This arrangement permits longitudinal movement of the probe 48 within the bushing 68 and the increased spacing between the bushing 68 and the inner wall of the conductor 46 and the space configuration between the bushings 65 and 68 are arranged to compensate for the difference in dielectric and size of the inner conductor at the probe.

In order to move the probe 48 within the bushing 68 a rod 70 is provided, extending through the hollow conductor 47, and the inner end of the probe is connected to this rod in any desired manner, as by soldering. The rod 70 is moved axially within the conductor 47 by means of a sleeve 71 which has threaded engagement with the extended end of the conductor 47, the rod 70 being rigidly secured to the outer end of the sleeve by means of a reduced diameter end portion 72 extending through an opening in the otherwise closed end of the sleeve 71 and lock nuts 73 which are threaded over the end of the rod 70. A disk 74 having a suitable knurled edge is provided, rigidly secured to the conductor 47 adjacent the sleeve 71, to provide a means to hold the conductor while the sleeve 71 is being turned. The sleeve 71 may be given a friction grip on the threads of the conductor 47 by means of a slot 75 which extends partly through the sleeve at right angles to the axis thereof and permits the extreme end portion to be sprung slightly so as to press against the threads.

In order to adjust the position of the probe 48 within the transmission line 45 the sleeve 71 is turned with respect to the tubular conductor 47, whereupon the rod 70 within the sleeve moves axially as the sleeve rides on the threads of the tubular conductor 47. Since the inner end of the probe 48 is rigidly secured to the end of the rod 70, the probe is moved within the bushing 68 and the bushing 65, so that by turning the sleeve in one direction the probe may be introduced farther into the transmission line and by turning it in the other direction the probe may be withdrawn.

Either the probe 23 or the probe 24 or both may be made adjustable in the manner shown in Figure 3 and the probes are adjusted so that the same amount of energy will reach the point 27 from the probe 23 as reaches it from the probe 24. This adjustment must be made with a wave traveling only in one direction and before measurements on a line are attempted.

The inner conductors 47 and 53 are supported by the stub 54 and also the extended end of the inner conductor 47. If desired, the stub 54 may be omitted, as well as the sleeve 56, cap 55 and opening 57, and the extended end of the inner conductor 47 relied on for support.

It will be understood that the lossy line sections 26 and 33 of Figure 2 may be formed with solid dielectric separating the conductors throughout the entire length of the lines, or portions only of those line sections may be made lossy, the important consideration being the impedance matching. In Figure 3 the adjustable probe construction is shown with air spacing between the conductors. Using the adjustable probe in this manner the lossy line section would be included in the remaining portion of the line, although, if desired, the solid dielectric could be provided between the inner and outer conductors of the construction of Figure 3.

In using the device of Figure 2 it is placed upon the transmission line 20 in the manner indicated, whereupon a wave, as, for instance, an incident wave, traveling in the direction of the arrow 37 will produce a response in the detector equal to the sum of the energy brought to the detector through the two line sections 26 and 33. However, a wave, as, for instance, a reflected wave, traveling in the direction of the arrow 38 will produce no effect on the detector 29 for the reasons already explained. If, then, the device is removed from the line, reversed, and placed on the line again, so that the probe 23 is inserted in the opening 22 and the probe 24 is inserted in the opening 21, then the two waves derived from the incident wave traveling in the direction of the arrow 37 will reach the detector 180 degrees out of phase and will cancel, while the two waves derived from the reflected wave traveling in the direction of the arrow 38 will reach the detector in phase and will therefore produce an effect upon it. By thus measuring the energy of the wave going in each direction in the line, the standing wave ratio may be calculated. The device is therefore useful in determining incident and reflected waves so as to calculate standing waves and standing wave ratios.

Another arrangement in which the invention may be used is illustrated in Figure 4. Here a transmission line 80 is shown provided with openings 81 and 82. Probes 83 and 84, forming the ends of the central conductors of the coaxial lines 85 and 86, respectively, are inserted in the openings 81 and 82. The sections 85 and 86 connect with a line section 87 at points 88 and 89 respectively. The point 88 is connected by means of a lossy line section 90 to a detector 91, while the point 89 is connected by means of a lossy line section 92 to a second detector 93.

This device is symmetrical and in one embodiment thereof the electrical length of the sections 85 and 86 was made equal to $$\frac{\lambda}{2}$$

and the electrical lengths between the probes and between the points 88 and 89 equal to $$\frac{3\lambda}{4}$$

The characteristic impedances of the sections 85 and 86 should be equal and equal to one half of the characteristic impedance of the section 87. The characteristic impedances of the sections 90 and 92 are equal and equal to the characteristic impedance of the section 87.

The impedance at the point 88 looking towards the point 89 will be equal to the characteristic impedance of the section 87. This is because the high impedance of the probe 84 reflected to the point 89, because of the half wave length electrical distance between the point 89 and the probe 84 is in shunt with the impedance of the lossy line 92 and has a negligible effect. Therefore, looking into the line 85 at the probe 83, the impedance of the point 88 will be the parallel impedances of the section 87 and section 90, which together equal the characteristic impedance of the section 85. Similarly the impedance looking into the line section 86 from the probe 84 is equal to the characteristic impedance of the line 86 which is terminated at the point 89 by the same impedance, this being made up of the parallel impedances of the lines 92 and 87, and, because the high impedance of the probe 83, reflected at the point 88, is in shunt with the impedance of the line section 90, the impedance at the point 89 equals the characteristic impedance of the section 86. The lossy line sections 90 and 92 are provided to prevent reflections of impedances from the detectors to the points 88 and 89 which would produce a mismatch.

The arrangement of Figure 4 permits measuring the waves traveling in opposite directions without moving the device. The detector 91 will measure the wave traveling to the left in the line 80 but will be unaffected by waves traveling towards the right. The detector 93, on the other hand, will measure the waves traveling towards the right but will be unaffected by waves traveling towards the left. One of the detectors 91 or 93 may, however, be omitted while still retaining the associated lossy line sections 90 or 92. If this were done, the device, as in the construction of Figure 2, would have to be reversed after taking a measure of a wave traveling in one direction along the line in order to obtain the measure of a wave traveling in the other direction.

It will be seen from the above description that I have provided a device which will distinguish between electric waves flowing in opposite directions along a transmission line and by means of which the energy in these waves may be separately measured by applying the device at a fixed position along the transmission line and the standing wave ratio obtained without moving the device along the line, as has been found necessary heretofore in order to obtain the standing wave ratio.

Various modifications of the invention may be made without departing from the spirit thereof, and I do not therefore desire to limit the invention except as it is limited by the appended claims.

What I desire to claim and secure by Letters Patent is:

1. A device for selectively measuring the amplitude of a high frequency signal in a transmission line comprising first and second probes extending into said transmission line, the spacing between said probes being equal to an odd number of quarter wave lengths of the signal measured in said transmission line, a first lossy transmission line coupled to said first probe, a second lossy transmission line coupled to said second probe, a second transmission line connecting said first and second lossy transmission lines, the combined lengths of said second lossy transmission line and said second transmission line being substantially an odd number of quarter wave lengths longer than said first lossy transmission line, a third transmission line coupled to the junction of said first lossy transmission line and said second transmission line, and a detector coupled to said third transmission line for measuring the combined amplitude of signals received by said two probes.

2. A device as in claim 1 wherein said third transmission line is adjustable in length to permit the matching of the impedance of said detector to the impedance at the junction of said first lossy transmission line and said second transmission line.

3. A device for selectively measuring the amplitude of a high frequency signal in a transmission line, said device comprising a first and a second probe extending into said transmission line at points spaced apart by an odd number of quarter wave lengths of the signal, a second and a third transmission line coupled to said first and second probes, respectively, and meeting in a common junction, said third transmission line being longer than said second transmission line by an odd number of quarter wave lengths at the frequency of said signal, at least a portion of said second and third transmission lines having relatively high electrical losses whereby the impedance at said junction is not transformed to said probes and a detector coupled to said junction for measuring the combined amplitude of signals received by said two probes.

4. Apparatus for selectively measuring the amplitude of a high frequency signal in a transmission line, said apparatus comprising a first and a second probe extending into said transmission line at points spaced apart by an odd number of quarter wave lengths of said signal, a detector for measuring the combined amplitude of signals received by said two probes, a second transmission line coupled to said detector, third and fourth transmission lines doupling said second transmission line to said first and second probes, respectively, said fourth transmission line being substantially an odd number of quarter wave lengths longer than said third transmission line, at least one of said three last-mentioned transmission lines having high electrical losses whereby the impedance of said detector is not transformed to said probes.

5. Apparatus as in claim 4 wherein said second transmission line has high electrical losses compared to said third and fourth transmission line.

6. Apparatus as in claim 4 wherein said third and fourth transmission lines have relatively high electrical losses compared to said second transmission line whereby the impedance of the circuit coupled to said first probe is substantially equal to the impedance of the circuit coupled to said second probe.

7. Apparatus for selectively measuring the amplitude of a high frequency signal in a transmission line, said apparatus comprising first and second probes extending into said transmission lines at points substantially an odd number of quarter wave lengths apart at the frequency of said signals, a first and a second detector each adapted to measure the amplitude of the combined signals from said first and second probes, a second transmission line coupled to said first detector, a third transmission line coupled to said second detector, a fourth transmission line coupled to said second and third transmission lines, a fifth transmission line coupling the junction of said second and said fourth transmission lines to said first probe, and a sixth transmission line coupling the junction of said third and said fourth transmission line to said second probe, the combined length of said fourth and fifth transmission lines being substantially an odd number of quarter wave lengths longer than said sixth transmission line whereby said second detector measures only signals traveling in a first direction in said first transmission line, and the combined length of said fourth and said sixth transmission lines being substantially an odd number of quarter wave lengths longer than said fifth transmission line whereby said first detector measures only signals travelling in the opposite direction in said first transmission line.

8. Apparatus as in claim 7 wherein the length of said fifth and sixth transmission lines are substantially equal to one-half wave length at the frequency of said signal and said fourth wave guide is substantially equal to three-quarters of a wave length at the frequency of said signal.

9. Apparatus as in claim 7 wherein said second, third and fourth transmission lines have a characteristic impedance substantially equal to twice the characteristic impedance of said fifth and sixth transmission lines, wherein said second and third transmission lines have high electrical losses and wherein said fifth and said sixth transmission lines are substantially one-half a wave length long at the frequency of said signal whereby the impedance coupled to said first probe is substantially equal to the impedance coupled to said second probe.

10. A device for selectively measuring the amplitude of a high frequency signal in a first transmission line, comprising second and third transmission lines, said second and third transmission lines differing in electrical length by substantially an odd number of quarter wave lengths of the signal to be measured, said second and third transmission lines having substantial electrical losses, means coupling first ends of said second and third transmission lines, respectively, to said first transmission line at points spaced apart an odd number of quarter wave lengths of said signal, a detector, means coupling second ends of said second and third transmission lines respectively to said detector.

11. A device for selectively measuring the amplitude of a high frequency signal in a first transmission line, comprising second and third transmission lines, said second and third transmission lines differing in electrical length by substantially an odd number of quarter wave lengths of the signal to be measured, means coupling first ends of said second and third transmission lines respectively to said first transmission line at points spaced apart an odd number of quarter wave lengths of said signal, a detector, means coupling second ends of said second and third transmission lines respectively to said detector, said second and third transmission lines including means for equalizing the input impedances of said second and third transmission lines as seen from said first transmission line.

WILLARD H. FENN.

REFERENCES CITED

The following references are of record in the file of this patent:

UNITED STATES PATENTS

| Number | Name | Date |
| --- | --- | --- |
| 2,106,713 | Bowen | Feb. 1, 1938 |
| 2,111,595 | Leng | Mar. 22, 1938 |
| 2,375,223 | Hansen et al. | May 8, 1945 |
| 2,423,390 | Korman | July 1, 1947 |